US012741313B2

(12) United States Patent
Nakayama et al.

(10) Patent No.: US 12,741,313 B2
(45) Date of Patent: Sep. 22, 2026

(54) CUBOID SILVER POWDER, METHOD OF PRODUCING SAME, AND CONDUCTIVE PASTE

(71) Applicant: DOWA ELECTRONICS MATERIALS CO., LTD., Tokyo (JP)

(72) Inventors: Seiji Nakayama, Tokyo (JP); Yuki Kimura, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 35 days.

(21) Appl. No.: 18/842,546

(22) PCT Filed: Feb. 27, 2023

(86) PCT No.: PCT/JP2023/007073

§ 371 (c)(1),
(2) Date: Aug. 29, 2024

(87) PCT Pub. No.: WO2023/176401

PCT Pub. Date: Sep. 21, 2023

(65) Prior Publication Data

US 2025/0170639 A1 May 29, 2025

(30) Foreign Application Priority Data

Mar. 16, 2022 (JP) ................................ 2022-040925

(51) Int. Cl.
*B22F 1/06* (2022.01)
*B22F 9/04* (2006.01)
*H01B 1/22* (2006.01)

(52) U.S. Cl.
CPC .................. *B22F 1/06* (2022.01); *B22F 9/04* (2013.01); *H01B 1/22* (2013.01);
(Continued)

(58) Field of Classification Search
CPC .................. B22F 1/06; B22F 2301/255; B22F 2304/00
(Continued)

(56) References Cited

FOREIGN PATENT DOCUMENTS

| | | | |
|---|---|---|---|
| CN | 104190946 | A | 12/2014 |
| JP | 2005-276773 | A | 10/2005 |

(Continued)

OTHER PUBLICATIONS

Tachika et al., JP2005276773A Google Patents machine translation of Nov. 27, 2025, Oct. 6, 2005, entire translation (Year: 2005).*

(Continued)

*Primary Examiner* — Katherine A Christy
(74) *Attorney, Agent, or Firm* — GREENBLUM & BERNSTEIN, P.L.C.

(57) ABSTRACT

A cuboid silver powder including silver particles having a BET specific surface area of 0.5 $m^2/g$ or less. An average aspect ratio of the cuboid silver powder is 1.2 or greater and less than 2.0 as determined by observing cross-sections of 100 or more silver particles from the silver particles. An average of a ratio represented by (Formula 1) below is 0.84 or greater. The ratio is a ratio of perimeter of one silver particle among the silver particles to perimeter of a rectangle circumscribing the one silver particle. (Formula 1): L/(2× major axis+2×minor axis) where L is the perimeter (μm) of the one silver particle, and the major axis and minor axis are respectively a long side (μm) and short side (μm) of the rectangle of minimum area circumscribing an outline of cross-section of the one silver particle.

8 Claims, 7 Drawing Sheets

(52) U.S. Cl.
CPC .................. *B22F 2009/043* (2013.01); *B22F 2301/255* (2013.01); *B22F 2304/00* (2013.01)

(58) Field of Classification Search
USPC .......................................................... 428/546
See application file for complete search history.

(56) References Cited

FOREIGN PATENT DOCUMENTS

| | | | |
|---|---|---|---|
| JP | 2007-254845 | A | 10/2007 |
| JP | 2007-265801 | A | 10/2007 |
| JP | 2012-092442 | A | 5/2012 |

OTHER PUBLICATIONS

Office Action that issued in related Japanese Patent Appl. No. 2022-040925, dated Apr. 10, 2023, along with English translation thereof.
Office Action that issued in related Japanese Patent Appl. No. 2022-040925, dated Sep. 13, 2023, along with English translation thereof.
International Search Report and Written Opinion of the International Searching Authority that issued in international Patent Application No. PCT/JP2023/007073, mailed Apr. 25, 2023, along with an English translation thereof.
Extended European Search Report that issued in the corresponding European patent application No. 23770361.6, dated May 26, 2025.

* cited by examiner

CUBOID SILVER POWDER, METHOD OF PRODUCING SAME, AND CONDUCTIVE PASTE

TECHNICAL FIELD

The present invention relates to a cuboid silver powder, a method of producing the cuboid silver powder, and a conductive paste.

BACKGROUND ART

In recent years, there is a demand for reducing a line width of electric wiring in solar cells or semiconductors. To this end, there is a need for a conductive paste that achieves a low resistance value and is unlikely to cause disconnection even when a line of electric wiring is thin.

As silver powder particles used for such a conductive paste, a spherical silver powder or flake-like silver powder is common. An average aspect ratio of particles of the spherical silver powder is close to 1, and shapes thereof are almost spheres. Particles of the flake-like silver powder have flat shapes, and an average aspect ratio thereof is 3 or greater, and is often 6 or greater. Such flake-like silver powder particles are produced, for example, by mixing a spherical silver powder and media by a tumbling ball mill or a vibrating ball mill, and allowing the spherical silver powder and the media to collide with each other (for example, see Patent Literature 1).

CITATION LIST

Patent Literature

Patent Literature 1: Japanese Unexamined Patent Application Publication No. 2007-254845

SUMMARY OF INVENTION

Technical Problem

When fine line printing is performed with a conductive paste using a spherical silver powder and a flake-like silver powder available in the related art, however, problems, such as increase in line resistance and increase in a disconnection rate, may arise.

Accordingly, the present invention aims to provide a cuboid silver powder used for a conductive paste that realizes electric wiring having low line resistance and a low disconnection rate, a method of producing the cuboid silver powder, and a conductive paste.

Solution to Problem

Means for solving the above problems are as follows.

<1> A cuboid silver powder including:

silver particles, wherein the cuboid silver powder has a BET specific surface area of 0.5 $m^2/g$ or less, an average aspect ratio of the cuboid silver powder is 1.2 or greater and less than 2.0 as determined by observing cross-sections of 100 or more silver particles from the silver particles, and an average of values of a ratio represented by (Formula 1) below is 0.84 or greater, the ratio being a ratio of a perimeter of one silver particle among the silver particles to a perimeter of a rectangle circumscribing the one silver particle, $$L/(2\times\text{major axis}+2\times\text{minor axis}) \quad \text{(Formula 1):}$$

where L is the perimeter (μm) of the one silver particle, and the major axis and the minor axis are, respectively, a long side (μm) and a short side (μm) of the rectangle of a minimum area that circumscribes an outline of a cross-section of the one silver particle.

<2> The cuboid silver powder according to <1>, wherein an average of values of a circularity coefficient represented by (Formula 2) below is from 0.65 to 0.88, $$4\pi S/L^2 \quad \text{(Formula 2):}$$

where S is an area ($\mu m^2$) of one silver particle among the silver particles and L is a perimeter (μm) of the one silver particle.

<3> The cuboid silver powder according to <2>, wherein a percentage of the silver particles of the cuboid silver powder having the circularity coefficient of 0.65 to 0.88 is 40% or greater.

<4> The cuboid silver powder according to any one of <1> to <3>, wherein an average of values of a shape factor represented by (Formula 3) below is from 1.4 to 2.6, $$\pi(L_{max})^2/4S \quad \text{(Formula 3):}$$

where S is an area ($\mu m^2$) of one silver particle among the silver particles, and $L_{max}$ is a maximum length (μm) of the one silver particle.

<5> The cuboid silver powder according to <4>, wherein a percentage of the silver particles of the cuboid silver powder having the shape factor of 1.4 to 2.6 is 40% or greater.

<6> The cuboid silver powder according to any one of <1> to <5>, wherein a value obtained by multiplying a 50th percentile value ($D_{50}$) of a volume-based cumulative particle size distribution of the silver particles of the cuboid silver powder, which is measured by a laser diffraction scattering particle size distribution analysis method, with the BET specific area is 6.5E−07 $m^3/g$ or greater and 1.0E−06 $m^3/g$ or less.

<7> The cuboid silver powder according to any one of <1> to <5>, wherein the BET specific surface area is 0.35 $m^2/g$ or less.

<8> A method for producing a cuboid silver powder, including a cuboid-forming step of loading a spherical silver powder and media to a container and allowing the spherical silver powder and the media to collide with each other by motions of the container to obtain the cuboid silver powder, wherein an average aspect ratio of silver particles of the cuboid silver powder is 1.2 or greater and less than 2.0 as determined by observing cross-sections of 100 or more silver particles from the silver particles of the cuboid silver powder, and an average of values of a ratio represented by (Formula 1) below is 0.84 or greater, the ratio being a ratio of a perimeter of one silver particle among the silver particles of the cuboid silver powder to a perimeter of a rectangle circumscribing the one silver particle, $$L/(2\times\text{major axis}+2\times\text{minor axis}) \quad \text{(Formula 1):}$$

where L is the perimeter (μm) of the one silver particle, and the major axis and the minor axis are, respectively, a long side (μm) and a short side (μm) of the rectangle of a minimum area that circumscribes an outline of a cross-section of the one silver particle.

<9> The method of producing the cuboid silver powder according to <8>, wherein the cuboid-forming step is performed without a lubricant.

<10> A conductive paste including the cuboid silver powder according to any one of <1> to <7>.

Effects of Invention

According to the present invention, the above various problems existing in the related art can be solved; the above aims can be achieved; and a cuboid silver powder used for a conductive paste that realizes electric wiring having low line resistance and a low disconnection rate, a method of producing the cuboid silver powder, and a conductive paste can be provided.

DESCRIPTION OF EMBODIMENTS

Cuboid Silver Powder

The cuboid silver powder of the present invention includes silver particles and has a BET specific surface area of 0.5 $m^2/g$ or less. An average aspect ratio of the cuboid silver powder as determined by observing cross-sections of 100 or more silver particles from the silver particles of the cuboid silver powder is 1.2 or greater and less than 2.0. An average of values of a ratio represented by (Formula 1) below is 0.84 or greater. The ratio is a ratio of a perimeter of one silver particle among the silver particles to a perimeter of a rectangle circumscribing the one particle.

$$L/(2\times\text{major axis}+2\times\text{minor axis}) \quad \text{(Formula 1):}$$

where L is the perimeter (μm) of the one silver particle, and the major axis and the minor axis are, respectively, a long side (μm) and a short side (μm) of the rectangle of a minimum area that circumscribes an outline of a cross-section of the one silver particle.

In the present invention, the cuboid silver powder refers to a group of cuboid silver particles, with which an average aspect ratio as determined by observing cross-sections of 100 or more silver particles from the silver particles is 1.2 or greater and less than 2, and an average of values of a ratio of a perimeter of one silver particle among the silver particles to a perimeter of a rectangle circumscribing the one silver particle is 0.84 or greater. The number of the silver particles subjected to observation of the cross-sections of the silver particles is not particularly limited, as long as the number of the silver particles is 100 or greater. A percentage of the particles (percentage by number), which satisfy that the ratio of the perimeter of the one silver particle to the perimeter of the rectangle circumscribing the one silver particle is 0.84 or greater, is preferably 40% or greater, and more preferably 50% or greater, relative to a total number of the silver particles measured.

Ratio of Perimeter of Particle to Perimeter of Rectangle Circumscribing Particle The average of values of the ratio represented by (Formula 1) above, which is a ratio of a perimeter of one silver particle among the silver particles of the cuboid silver powder of the present invention to a perimeter of a rectangle circumscribing the one silver particle, is 0.84 or greater, preferably 0.84 or greater and 1.00 or less, and more preferably 0.85 or greater and 1.00 or less.

When the average of values of the ratio represented by (Formula 1) above, which is the ratio of the perimeter of the silver particle to the perimeter of the rectangle circumscribing the silver particle, is 0.84 or greater, the cuboid silver powder prepared into a conductive paste can contribute to formation of electric wiring of low line resistance.

Figure 1:
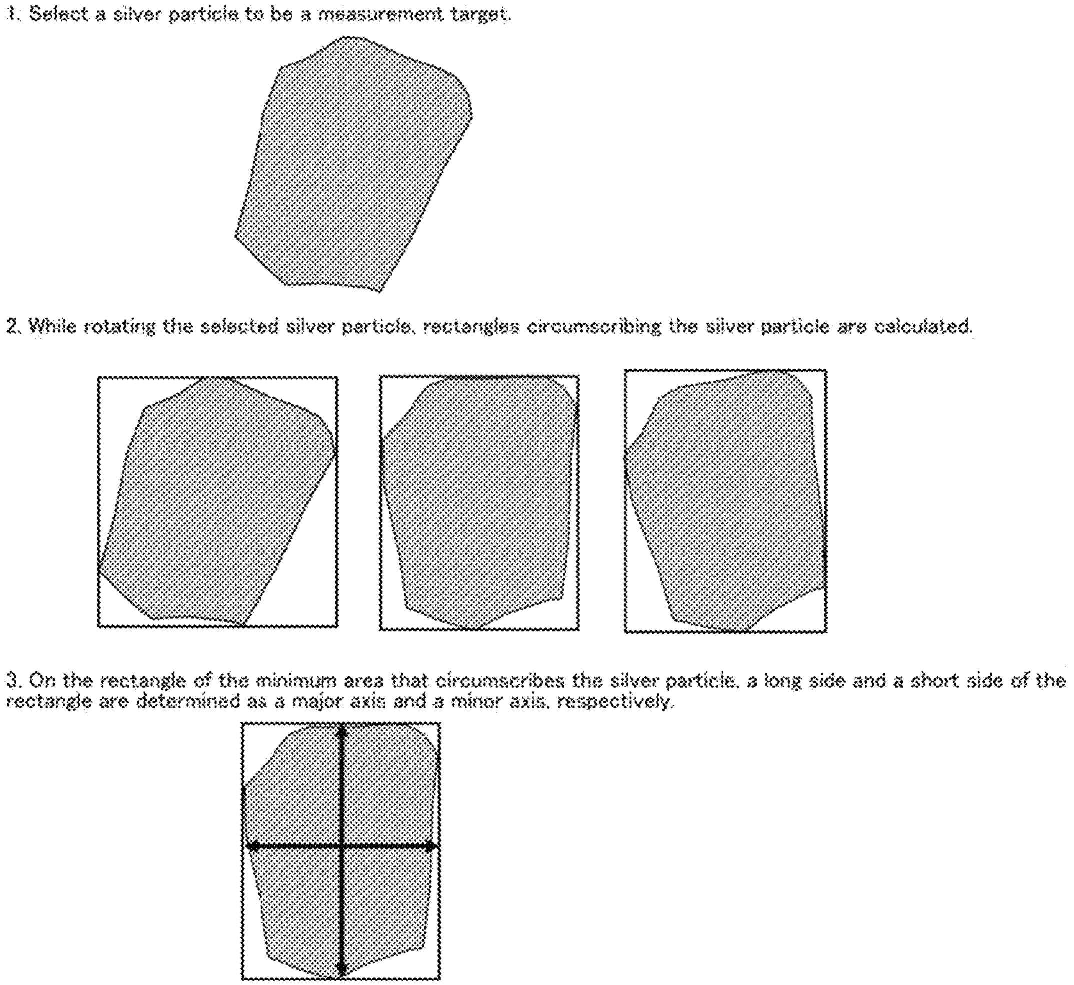
FIG. 1 is a view describing a rectangle of a minimum area that circumscribes an outline of a cross-section of a silver particle.

FIG. 1 is a view describing a rectangle of a minimum area circumscribing an outline of a cross-section of one silver particle. As illustrated in FIG. 1, a silver particle, which will be a measurement target, is selected, and while rotating the selected silver particle around 360 degrees, various rectangles circumscribing the silver particle are calculated. Among the calculated rectangles, the rectangle having the minimum area is selected, and a long side and a short side of the selected rectangle are determined as a major axis and a minor axis, respectively.

A measuring method of L (a perimeter of a silver particle), and a major axis and a minor axis in (Formula 1) above will be described later.

The silver particles of the cuboid silver powder are not as flat as silver particles of a flake-like silver powder, but each of the silver particles has a flat surface at part of a surface thereof, and a cross-section of each of the silver particles of the cuboid silver powder has a shape closer to a square (rectangle) rather than a circle (oval). Therefore, the average of values of the ratio represented by (Formula 1) above, which is a ratio of a perimeter of one silver particle to a perimeter of a rectangle circumscribing an outline of a cross-section of the one silver particle, becomes 0.84 or greater. Since the flat surface is a mechanically formed surface as described later, the flat surface does not need to be a crystal surface derived from a crystal structure (face-centered cubic).

Aspect Ratio

An average aspect ratio (major axes of the silver particles/minor axes of the silver particles) of the cuboid silver powder of the present invention is 1.2 or greater and less than 2.0, preferably 1.2 or greater and 1.9 or less, and more preferably 1.3 or greater and 1.8 or less.

Since the average aspect ratio is 1.2 or greater and less than 2.0, which is smaller than an average aspect ratio of a flake-like silver powder, it is advantageous when the cuboid silver powder is prepared into a conductive paste and a size of a nozzle edge is reduced for fine line printing, because the silver particles are unlikely to cause clogging and impair ejectability of the paste.

The major axis and minor axis of the silver particle are, respectively, a long side and short side of a rectangle of a minimum area that circumscribes the outline of the cross-section of the silver particle. A measuring method of the major axis and minor axis of the silver particle will be described later.

When a spherical silver powder and a flake-like silver powder are mixed, silver particles each having an aspect ratio of less than 2 may be classified as a spherical silver powder, and silver particles each having an aspect ratio of 2 or greater may be classified as a flake-like silver powder. However, this is the case that only two types of powders, i.e., the spherical silver powder and the flake-like silver powder, are present. An average aspect ratio of the spherical silver powder is typically close to 1. An average aspect ratio of the flake-like silver powder measured by the above measuring method is typically 3 or greater.

Unlike the measuring method of the aspect ratio for the present invention, if an aspect ratio (major axis/thickness) of each of the silver particles of the flake-like silver powder is measured by adding the flake-like silver particles to a resin, while aligning the orientations of the flake-like silver particles to uniformly measure thicknesses of the flat shapes, an average of values of the aspect ratio is generally 6 or greater.

Circularity Coefficient and Shape Factor

The cuboid silver powder of the present invention preferably satisfies either that the average of values of the circularity coefficient represented by (Formula 2) below is from 0.65 to 0.88, or the average of values of the shape factor represented by (Formula 3) below is preferably 1.4 to 2.6.

$$4\pi S/L^2 \quad \text{(Formula 2):}$$

where S is an area (μm$^2$) of a silver particle, and L is a perimeter (μm) of the silver particle.

$$\pi(L_{max})^2/4S \quad \text{(Formula 3):}$$

where S is an area (μm$^2$) of a silver particle, and $L_{max}$ is a maximum length (μm) of the silver particle, where the maximum length is a maximum distance between parallel lines between which an outline of the silver particle is interposed.

Measuring methods of S (the area of the silver particle) and L (the perimeter of the silver particle) of (Formula 2) above, and S (the area of the silver particle) and $L_{max}$ (the maximum length of the silver particle) will be described later.

The average of values of the circularity coefficient of the cuboid silver powder of the present invention is preferably 0.65 to 0.88, and more preferably 0.75 to 0.85. Moreover, a percentage (by number) of the silver particles of the cuboid silver powder having the circularity coefficient of 0.65 to 0.88 is preferably 40% or greater, and more preferably 50% or greater.

The average of values of the shape factor of the cuboid silver powder of the present invention is preferably 1.4 to 2.6, and more preferably 1.5 to 2.0. Moreover, a percentage (by number) of the silver particles of the cuboid silver powder having the shape factor of 1.4 to 2.6 is preferably 40% or greater, and more preferably 50% or greater.

Since the cuboid silver powder has the circularity coefficient and shape factor satisfying the respective numerical ranges as described above, and silver particles thereof have cross-sectional shapes, which have been transformed from circular shapes to shapes closer to squares (cuboid not spherical), the cuboid silver powder prepared into a conductive paste can contribute to formation of electric wiring having low line resistance. Although the reason for this is not yet certain, it is considered that the cuboid silver powder of the present invention can increase the density of the silver particles in the wiring electrode, and the number of contact points between the silver particles also increases.

Figure 2:
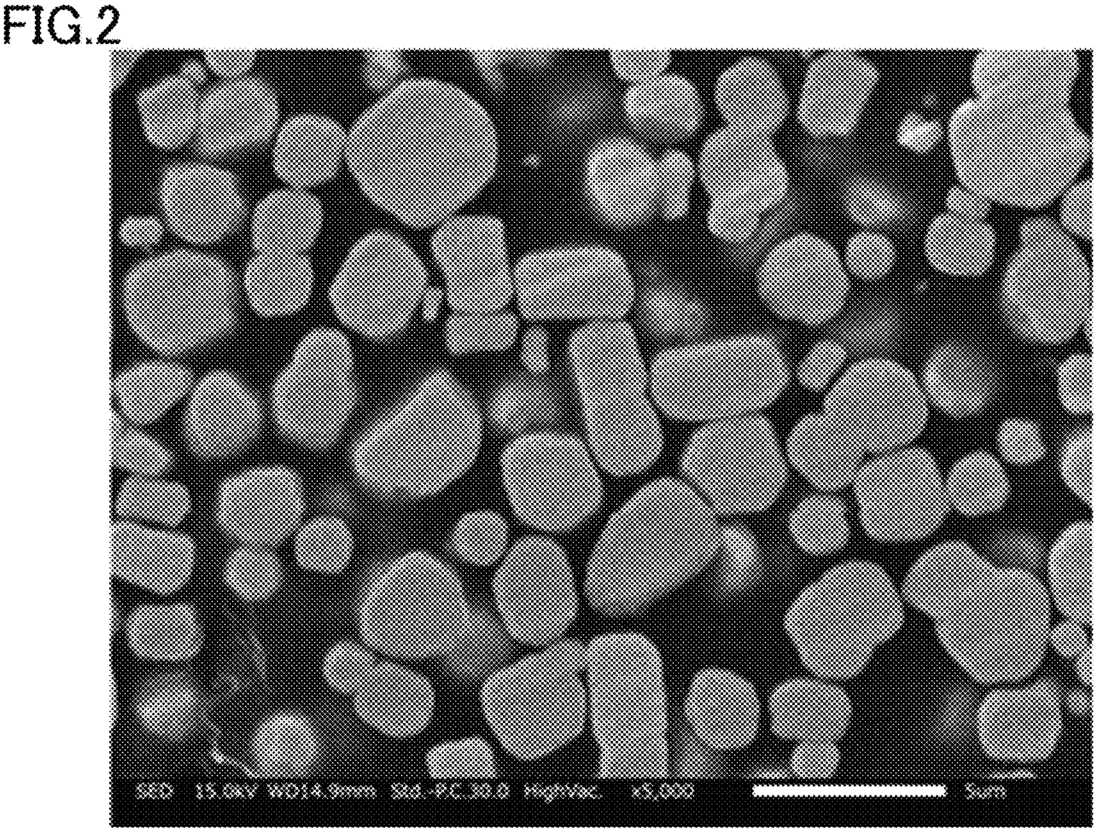
FIG. 2 is a scanning electron microscopy photograph of the silver powder for describing silver particles that can be used as measurement targets for measurement of a ratio of a perimeter of a particle to a perimeter of a rectangle circumscribing the particle, circularity coefficient, shape factor, and aspect ratio.

Methods of Determining Ratio of Perimeter of Particle to Perimeter of Rectangle Circumscribing Particle, Circularity Coefficient, Shape Factor, and Aspect Ratio The silver powder is added to a resin (EPOFIX RESIN produced by Struers) with a curing agent (EPOFIX HARDENER produced by Struers), and the resin is cured. The cured resin is polished by a cross-section polisher (ArBlade5000, produced by Japan High-Tech Corporation) to expose cross-sections of the silver particles. The cross-sections of the silver particles are observed under a scanning electron microscope (JEOL JSM-IT300LV, produced by JEOL Ltd.) at magnification of 5,000 times. Note that, the silver powder and the resin are manually mixed and the mixture is poured into a mold to be cured. Therefore, the orientations of the silver particles exposed after polishing are random. The measurement is performed on cross-sections of the silver particles with which entire outlines can be observed within a field of view, as depicted in FIG. 2.

Next, an outline of the silver particle is traced on each of the cross-sections of randomly selected 100 or more silver particles using image analysis software (image-analyzing particle size distribution measurement software MacView, produced by MOUNTECH Co., Ltd.), and a major axis, a minor axis, a perimeter (L) of each silver particle, an area (S) of each silver particle, and a maximum length ($L_{max}$) of each silver particle are measured. As the major axis and the minor axis, values of the major axis and minor axis with which an area of a rectangle circumscribing the silver particle becomes the minimum are automatically calculated. Based on the obtained values, a ratio of the perimeter of the silver particle to the perimeter of the rectangle circumscribing the silver particle is calculated according to (Formula 1) above. Moreover, an average of the values of the circularity coefficient and an average of the values of the shape factor are calculated according to (Formula 2) above and (Formula 3) above, respectively, and a percentage of the silver particles having the circularity coefficient of 0.65 to 0.88 and a percentage of the silver particles having the shape factor of 1.4 to 2.6 are determined. Moreover, an average of the values of the aspect ratio (major axis/minor axis) is calculated.

Unlike the cuboid silver powder of the present invention, a spherical silver powder has a value closer to 0.79 as an average of values of the ratio represented by (Formula 1) above, which is the ratio of the perimeter of the silver particle to the perimeter of the rectangle circumscribing the silver particle, rather than the value of the cuboid silver powder of the present invention. The average value, 0.79, is the value of spherical particles.

Values of the circularity coefficient and shape factor of the spherical silver powder are closer to 1 rather than the values of the circularity coefficient and shape factor of the cuboid silver powder of the present invention.

If only the average aspect ratio is considered, the average aspect ratio of the cuboid silver powder of the present invention is within the numerical range of the spherical silver powder. However, the cuboid silver powder of the present invention can be distinguished from the spherical silver powder in the ratio of the perimeter of the silver powder to the perimeter of the rectangle circumscribing the silver powder, represented by (Formula 1), the average of values of the circularity coefficient, and the average of values of the shape factor.

As the cuboid silver powder of the present invention is observed under a scanning electron microscope, the cuboid silver powder is not a spherical silver powder, nor a flake-like silver powder having an average aspect ratio of 2 or greater.

Accordingly, the cuboid silver powder of the present invention is not a spherical silver powder nor a flake-like silver powder particles.

BET Specific Surface Area

The BET specific surface area of the cuboid silver powder of the present invention is 0.5 $m^2/g$ or less, preferably 0.35 $m^2/g$ or less, more preferably 0.30 $m^2/g$ or less, and yet more preferably 0.1 $m^2/g$ or greater and 0.27 $m^2/g$ or less.

When the BET specific area is 0.5 $m^2/g$ or less and the cuboid silver powder is used to prepare a conductive paste, the silver particles can be smoothly ejected from a tip of a nozzle, which is effective for inhibition of disconnection in fine line printing.

The BET specific surface area can be measured by Macsorb HM-model 1210 (produced by MOUNTECH Co., Ltd.) according to a BET single-point method by nitrogen adsorption. For the measurement of the BET specific surface area, degassing is performed before the measurement at the condition of 60° C. for 10 minutes.

50th Percentile Value ($D_{50}$) of Volume-Based Cumulative Particle Size Distribution, Ratio $[(D_{90}-D_{10})/D_{50}]$, and Value Obtained by Multiplying $D_{50}$ With BET Specific Surface Area A 50th percentile value ($D_{50}$) of the volume-based cumulative particle size distribution of the cuboid silver powder as determined by a laser diffraction scattering particle size analysis method is preferably 0.5 μm or greater and 5 μm or less, and more preferably 1 μm or greater and 4 μm or less.

A ratio $[(D_{90}-D_{10})/D_{50}]$ of a difference between a 10th percentile value ($D_{10}$) and a 90th percentile value ($D_{90}$) to the 50th percentile value ($D_{50}$) of the volume-based cumulative particle size distribution of the cuboid silver powder as determined by the laser diffraction scattering particle size analysis method is preferably 2.0 or less, more preferably 1.5 or less, and yet more preferably 1.3 or less.

The value obtained by multiplying the 50th percentile value ($D_{50}$) of the volume-based cumulative particle size distribution with the BET specific surface area is preferably 6.5E−07 $m^3/g$ or greater and 1.0E−06 $m^3/g$ or less, and more preferably 6.5E−07 $m^3/g$ to 9.0E−07 $m^3/g$ or less.

The symbol "E" represents that a numerical value following the symbol "E" is an "exponent" with a base of 10, and that the numerical value before "E" is multiplied by the numerical value expressed by the exponential function with the base of 10. For example, "1.0E−07" represents "$1.0\times10^{-7}$."

The value obtained by multiplying the 50th percentile value ($D_{50}$) of the volume-based cumulative particle size distribution with the BET specific surface area tends to be larger in a flake-like silver powder than in the cuboid silver powder.

Tapped Density

A tapped density of the cuboid silver powder is preferably from 3.0 g/mL to 7.0 g/mL, and more preferably from 4.0 g/mL to 7.0 g/mL.

As a measuring method of the tapped density of the cuboid silver powder, for example, 30 g of a silver powder sample is weighed and added to a 20 mL test tube, the sample in the test tube is tapped 1,000 times with a drop of 20 mm using a tapped density measuring device (a bulk density measuring device SS-DA-2, produced by Shibayama Scientific Co., Ltd.), and a tapped density of the sample is calculated by an equation, that is, a tapped density=a weight of the sample (30 g)/a volume (mL) of the sample after tapping.

Ignition Loss

The ignition loss (loss on ignition) of the cuboid silver powder is also referred to as Ig-Loss, and indicates a change in weight when heated from room temperature to 800° C. Specifically, the ignition loss of the cuboid silver powder represents an amount of a composition of the cuboid silver powder excluding the silver, and is an index indicating an amount of remaining components, such as a surface treating agent included in a spherical silver powder, a lubricant added to silver slurry during a cuboid-forming step, and the like, as components remaining in the cuboid silver powder.

The ignition loss of the cuboid silver powder is not particularly limited, and may be appropriately selected according to the intended purpose. The ignition loss is preferably from 0.05% to 3.0%, and more preferably from 0.1% to 1.0%.

Method of Producing Cuboid Silver Powder

The method of producing a cuboid silver powder according to the present invention includes a cuboid-forming step of loading a spherical silver powder and media in a container and allowing the spherical silver powder and the media to collide with each other by motions of the container to obtain a cuboid silver powder. The method may further include other steps as necessary.

An average aspect ratio of the cuboid silver powder as determined by observing cross-sections of 100 or more silver particles from the silver particles of the cuboid silver powder is 1.2 or greater and less than 2.0. An average of values of a ratio of a perimeter of one silver particle among the silver particles to a perimeter of a rectangle circumscribing the one particle, which is represented by (Formula 1) below, is 0.84 or greater.

$$L/(2\times\text{major axis}+2\times\text{minor axis}) \quad \text{(Formula 1):}$$

where L is the perimeter (μm) of the one silver particle, and the major axis and the minor axis are, respectively, a long side (μm) and a short side (μm) of the rectangle of a minimum area that circumscribes an outline of a cross-section of the one silver particle.

The spherical silver powder (raw powder) used in the method of producing the cuboid silver powder of the present invention is preferably a silver powder having the following characteristics.

A 50th percentile value ($D_{50}$) of a volume-based cumulative particle size distribution as determined by a laser diffraction scattering particle size distribution analysis method is preferably 0.5 μm or greater and 5 μm or less, and more preferably 1 μm or greater and 4 μm or less.

A BET specific surface area is preferably 0.5 $m^2/g$ or less, more preferably 0.3 $m^2/g$ or less, and yet more preferably 0.1 $m^2/g$ or greater and 0.27 $mm^2/g$ or less.

An average aspect ratio is preferably from 1 to 1.5, and more preferably close to 1.

An average of values of the shape factor is preferably smaller than 1.4, and more preferably close to 1.

An average of values of the circularity coefficient is preferably greater than 0.88, and more preferably close to 1.

Measuring methods of the 50th percentile value ($D_{50}$) of the volume-based cumulative particle size distribution as determined by a laser diffraction scattering particle size distribution analysis method, the BET specific area, the average aspect ratio, the average of values of the shape factor, and the average of values of the circularity coefficient are the same as the measuring methods for the above cuboid silver powder.

The spherical silver powder may be a commercial product, or may be produced by any production method (e.g., a wet reduction method) available in the related art. Examples of the commercial product include AG-5-54F and AG-5-1F (both produced by DOWA ELECTRONICS MATERIALS CO., LTD.), and the like. The details of the wet reduction method are described, for example, in Japanese Unexamined Patent Application Publication No. 07-76710.

The media (may be also referred to as “balls” or “beads”) is preferably spherical media particles having a diameter of from 0.5 mm to 3 mm. When the diameter of the media particles is less than 0.5 mm, the media may cause clogging or the like to impair separation efficiency when the processed silver powder is separated from the media. When the diameter of the media particles is greater than 3 mm, a degree of aggregation of the silver particles increases, and the 50th percentile value ($D_{50}$) of the volume-based cumulative particle size distribution of the obtained silver powder becomes very large so that a cuboid silver powder may not be able to be readily produced.

A material of the media is not particularly limited, and may be appropriately selected according to the intended purpose. Examples of the material include: metals, such as titanium, stainless steel, and the like; and ceramics, such as alumina, zirconia, and the like. Among the above examples, stainless steel is preferred considering potential contamination of the silver powder with the material of the media.

A processing time of the cuboid-forming step is preferably from 10 minutes to 180 minutes. The processing time may be appropriately adjusted according to the rotational speed of the device to meet an objective such that each of the silver particles collides with the media to form a flat surface at least at part of the surface thereof, but the processing is terminated before the processing is excessively progressed to make the silver particles flat. As the processing time is prolonged and a load applied to the silver particles is increased, the silver particles may be aggregated, or a percentage of the silver particles, which are transformed into a flake-like silver powder having a large aspect ratio, increases. Thus, a silver powder, which mainly includes cuboid silver particles and in which the cuboid silver particles constitute 40% or greater of the silver particles observed by electron microscopy, may not be obtained. By adjusting “the time, rotational speed, and filling rates of the media and the silver powder relative to a container volume” to allow each of the silver particles to collide with the media in a manner such that an aspect ratio of the resultant silver powder does not become as large as an aspect ratio of flake-like silver powder particles, the cuboid silver powder of the present invention can be produced, that is, the cuboid silver powder having an average aspect ratio of 1.2 or greater and less than 2.0 as determined by observing cross-sections of 100 or more silver particles from the silver particles of the cuboid silver powder, and the average of values of the ratio represented by the above formula (1) of 0.84 or greater, where the ratio is a ratio of the perimeter of the silver particle to the perimeter of the rectangle circumscribing the silver particle.

A device used for the cuboid-forming step is not particularly limited, and may be appropriately selected according to the intended purpose. Examples of the device include media-stirring crushers, such as bead mills, ball mills, attritors, and the like.

A lubricant may be used or may not be used in the cuboid-forming step. From the viewpoint of inhibition of increase in ignition loss (Ig-Loss) and inhibition of reduction in line resistance, the lubricant is preferably not used. The lubricant is not particularly limited, and may be appropriately selected according to the intended purpose. Examples of the lubricant include stearic acids, oleic acids, and the like.

Other Steps

Examples of the above other steps include a spherical-silver-powder-particles production step, a washing step, a drying step, and the like.

Conductive Paste

The conductive paste of the present invention includes the cuboid silver powder of the present invention, preferably includes a resin and a solvent, and may further include other components as necessary.

The conductive paste may include, in addition to the cuboid silver powder of the present invention, silver powder particles of other shapes (e.g., a spherical silver powder, a flake-like silver powder, etc.).

A total amount of the silver powder including the cuboid silver powder in the conductive paste is preferably 50% by mass to 98% by mass, and more preferably 80% by mass to 95% by mass, relative to a total amount of the conductive paste.

The resin is not particularly limited, and may be appropriately selected according to the intended purpose. Examples of the resin include epoxy resins, acrylic resins, polyester resins, polyimide resins, polyurethane resins, phenoxy resins, silicone resins, ethyl cellulose, a mixture of any combination of the foregoing, and the like. The above-listed examples may be used alone or in combination.

The solvent is not particularly limited, and may be appropriately selected according to the intended purpose. Examples of the solvent include terpineol, butyl carbitol, butyl carbitol acetate, texanol, and the like. The above-listed examples may be used alone or in combination.

Examples of the above components include curing agents, glass frits, dispersants, surfactants, viscosity modifiers, and the like.

A production method for the conductive paste is not particularly limited, and may be appropriately selected according to the intended purpose. For example, the cuboid silver powder of the present invention, the resin, the solvent, and optionally the silver powder particles of other shapes and the above other components can be mixed to produce the conductive paste. For the mixing, for example, an ultrasonic disperser, a disper, a three roll mill, a ball mill, a bead mill, a biaxial kneader, a planetary centrifugal mixer, or the like can be used.

A viscosity of the conductive paste is not particularly limited, and may be appropriately selected according to the intended purpose. Under conditions in which a paste temperature is 25° C. and a rotational speed is 1 rpm, the viscosity of the conductive paste is preferably from 150 Pa·s to 800 Pa·s, and more preferably from 200 Pa·s to 750 Pa·s.

When the viscosity of the conductive paste is less than 150 Pa·s, "bleeding" may occur during printing. When the viscosity of the conductive paste is greater than 800 Pa·s, uneven printing may occur.

The viscosity of the conductive paste is measured, for example, by 5XHBDV-IIIUC produced by Brookfield serving as a rotary viscometer with CPE-52 as a cone spindle at a measuring temperature of 25° C. and at cone spindle rotational speed of 1 rpm. As a value of the viscosity, a value measured by rotating the cone spindle for 5 minutes is used.

The conductive paste of the present invention includes the cuboid silver powder of the present invention, and therefore the conductive paste is suitable for forming fine lines having low line resistance. Therefore, the conductive paste is suitably used, for example, in applications of electrodes or electric wiring, such as collector electrodes of solar cells, external electrodes of chip-type electronic components, RFIDs, electromagnetic shielding, membrane switches, electroluminescence, and the like; applications of conductive adhesives, such as oscillator bonding, bonding between solar cells, such as shingled cells; and the like.

EXAMPLES

Examples of the present invention will be examples hereinafter, but the present invention is not limited to Examples in any way.

Example 1

A spherical silver powder (AG-5-54F, produced by DOWA HIGHTECH CO., LTD.) in an amount of 1.16 kg was prepared, the spherical silver powder was loaded to a 5 L (volume) container of a vibration ball mill (B-1, produced by CHUO KAKOHKI CO., LTD.) together with 12 kg of SUS balls (diameter of 0.8 mm) serving as media, and the silver particles of the spherical silver powder and the media were allowed to collide with each other at 800 rpm for 60 minutes. After separating the silver powder and the SUS balls from each other, the silver powder was crushed by a compact crusher (SK-M10, produced by KYORITSU RIKO), followed by sieving with a sieve having an opening of 25 μm.

Figure 3A:
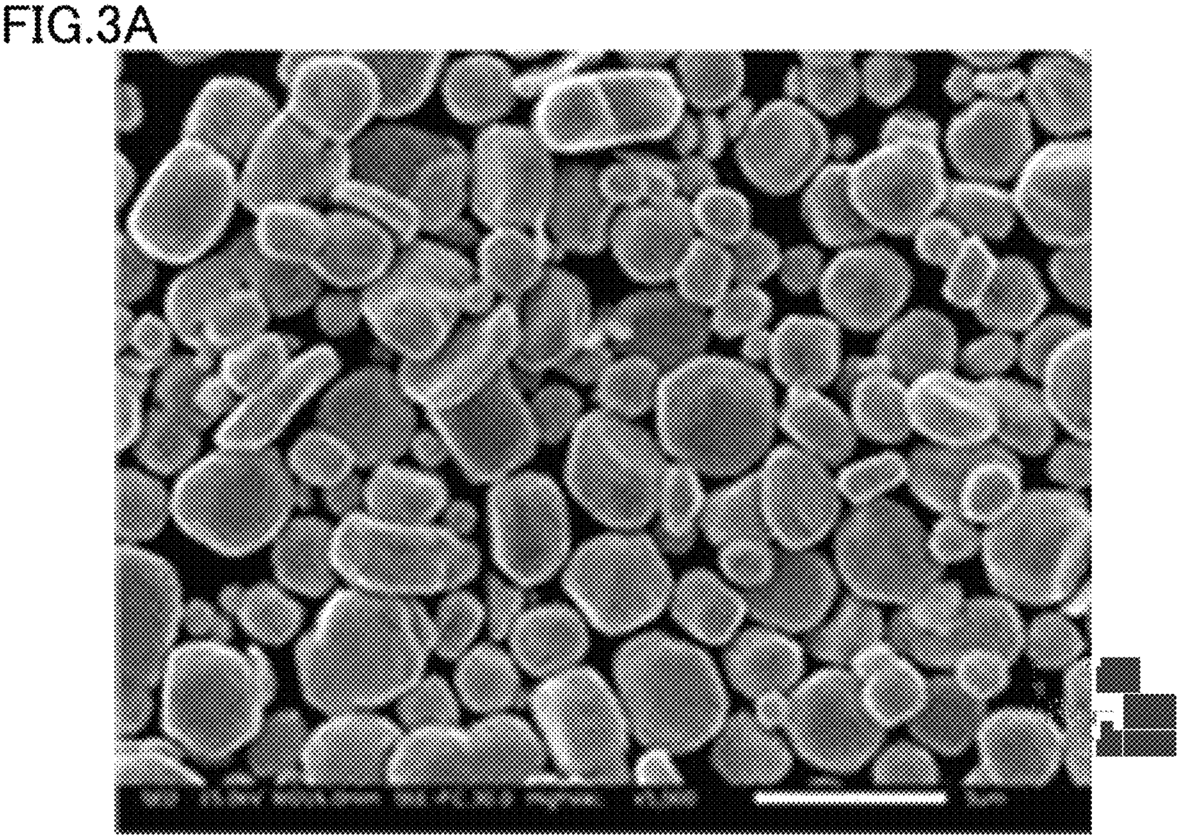
FIG. 3A is a scanning electron microscopy photograph of the silver powder produced in Example 1.
Figure 3B:
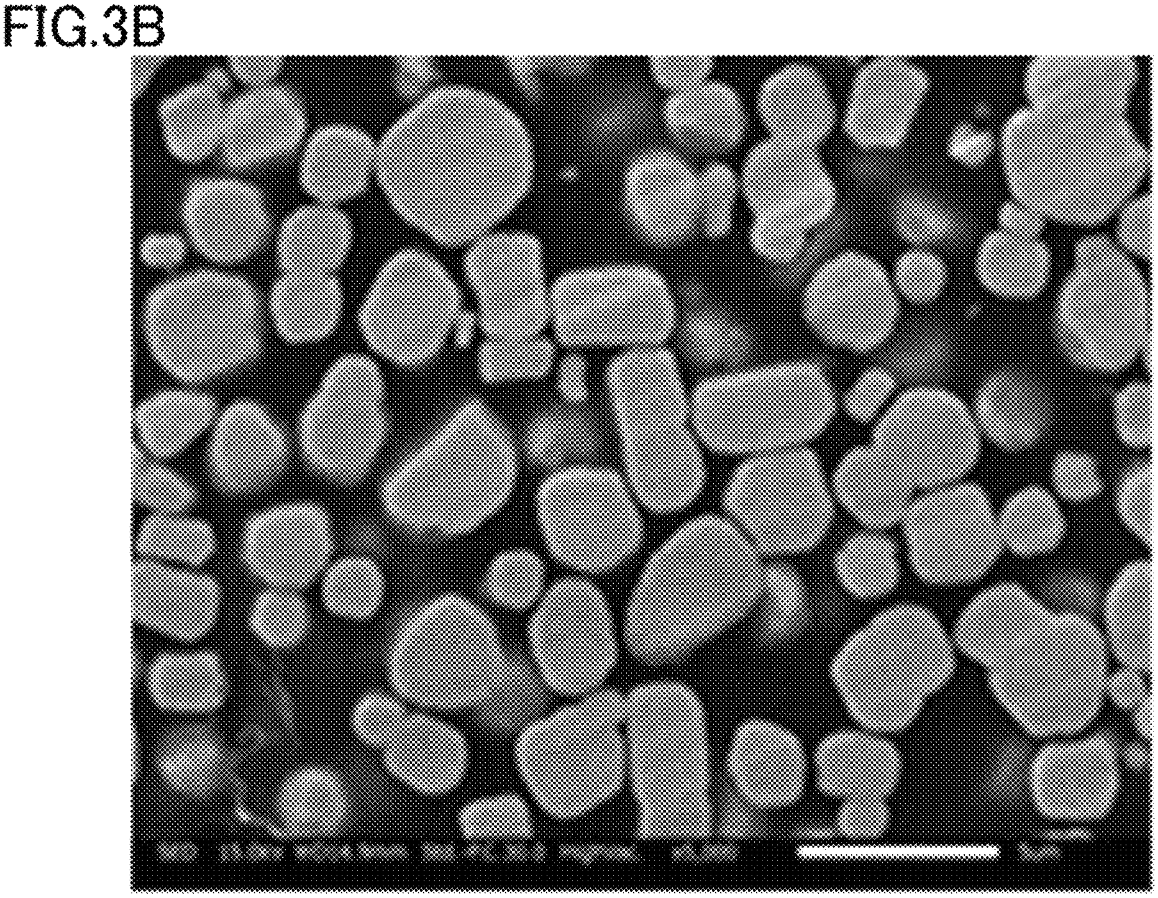
FIG. 3B is a scanning electron microscopy photograph of a cross-section of the silver powder produced in Example 1.

The scanning electron microscopy photograph of the cuboid silver powder obtained in Example 1 is presented in FIG. 3A, and the scanning electron microscopy photograph of the cross-section of the cuboid silver powder is presented in FIG. 3B.

Example 2

A spherical silver powder (AG-5-54F, produced by DOWA HIGHTECH CO., LTD.) in an amount of 1.16 kg was prepared, 3.84 g of stearic acid serving as a lubricant was added to the spherical silver powder, and the mixture was sufficiently mixed. The mixture was loaded to a 5 L (volume) container of a vibration ball mill (B-1, produced by CHUO KAKOHKI CO., LTD.) together with 12 kg of SUS balls (diameter of 0.8 mm) serving as media, and the silver particles of the spherical silver powder and the media were allowed to collide with each other at 800 rpm for 60 minutes. After separating the silver powder and the SUS balls from each other, the silver powder was crushed by a compact crusher (SK-M10, produced by KYORITSU RIKO), followed by sieving with a sieve having an opening of 25 μm.

Figure 4A:
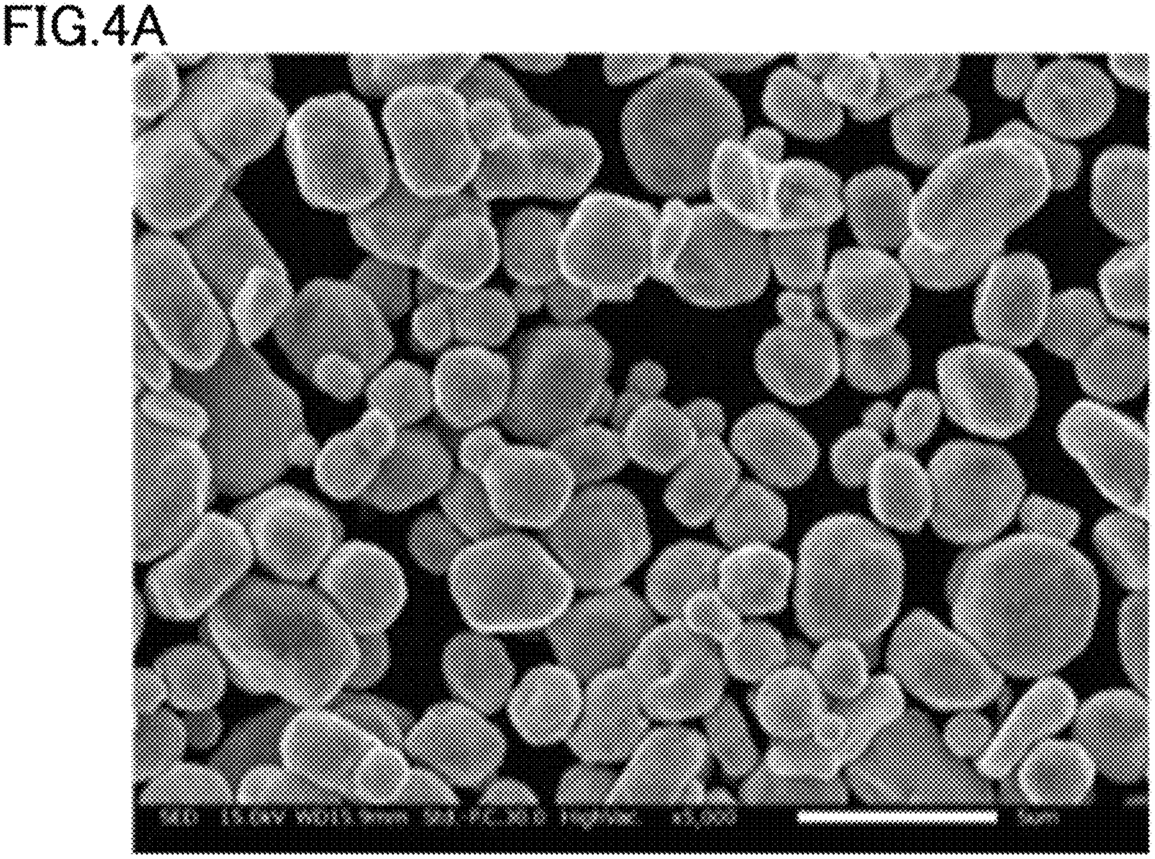
FIG. 4A is a scanning electron microscopy photograph of the silver powder produced in Example 2.
Figure 4B:
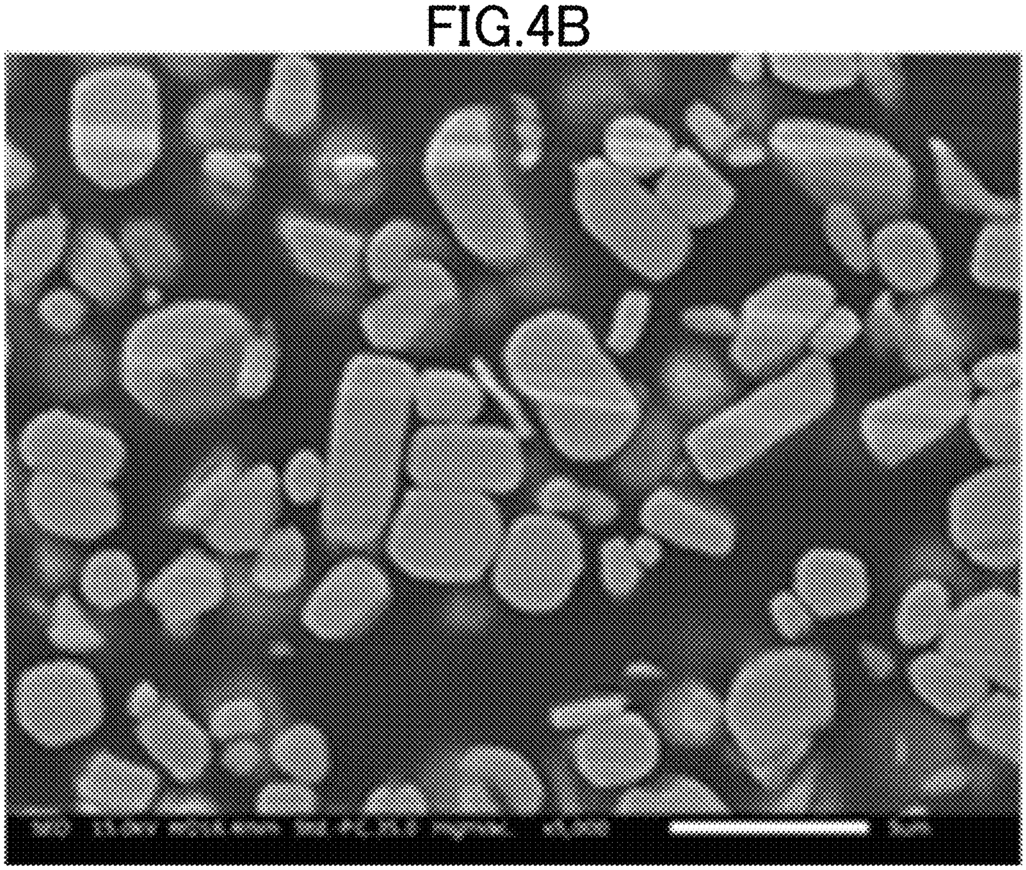
FIG. 4B is a scanning electron microscopy photograph of a cross-section of the silver powder produced in Example 2.

The scanning electron microscopy photograph of the cuboid silver powder obtained in Example 2 is presented in FIG. 4A, and the scanning electron microscopy photograph of the cross-section of the cuboid silver powder is presented in FIG. 4B.

Example 3

A spherical silver powder (AG-5-1F, produced by DOWA HIGHTECH CO., LTD.) in an amount of 1.61 kg was prepared, the spherical silver powder was loaded to a 6 L (volume) container of a tumbling ball mill together with 16.62 kg of SUS balls (diameter of 1.6 mm) serving as media, and the silver particles of the spherical silver powder and the media were allowed to collide with each other at 71 rpm for 180 minutes. After separating the silver powder and the SUS balls from each other, the silver powder was crushed by a compact crusher (SK-M10, produced by KYORITSU RIKO), followed by sieving with a sieve having an opening of 25 μm.

Figure 5A:
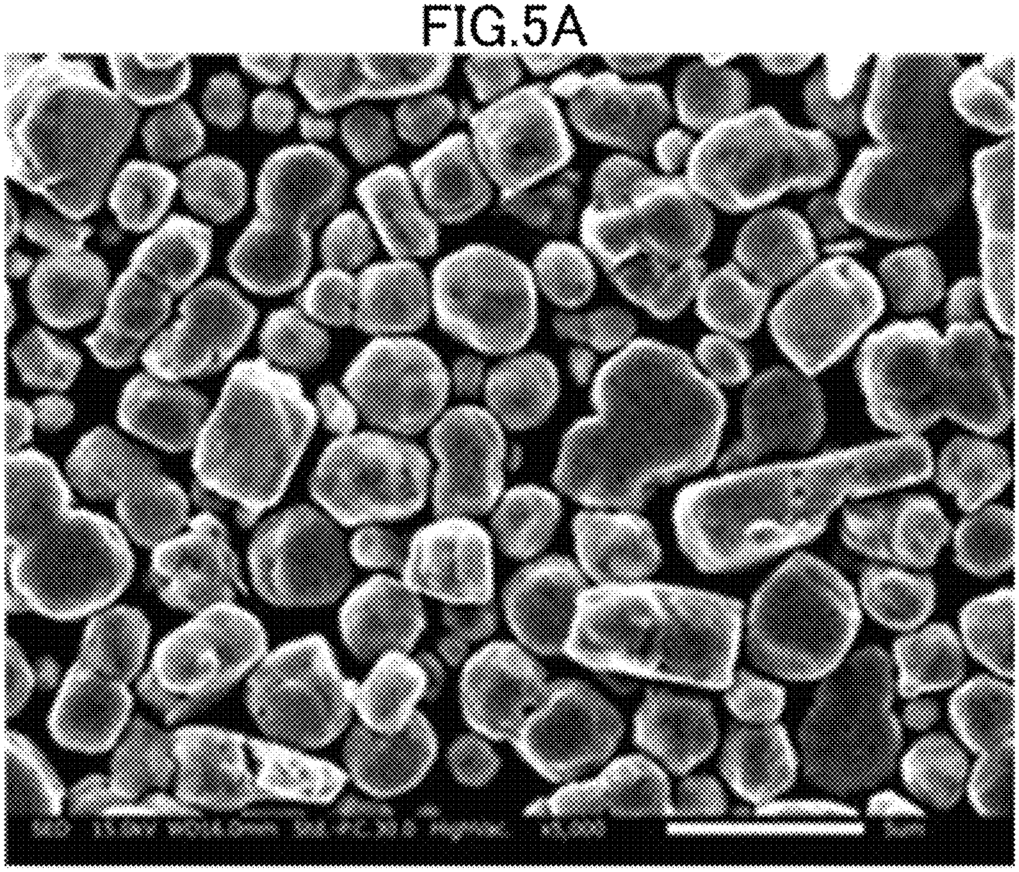
FIG. 5A is a scanning electron microscopy photograph of the silver powder produced in Example 3.
Figure 5B:
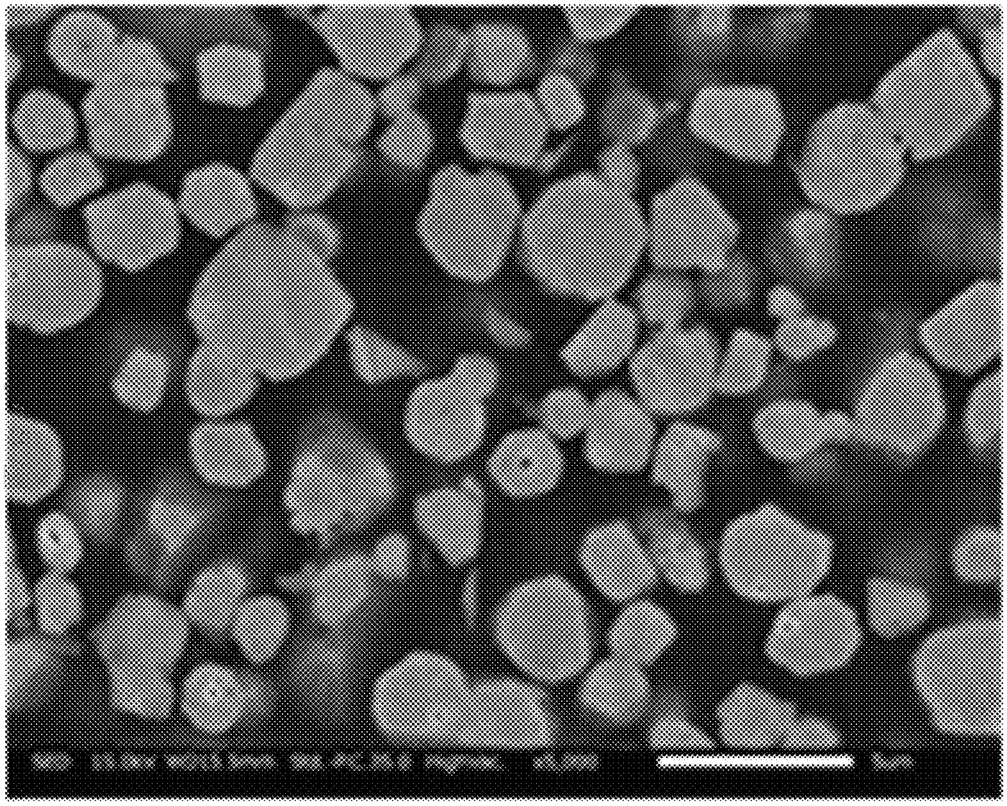
FIG. 5B is a scanning electron microscopy photograph of a cross-section of the silver powder produced in Example 3.

The scanning electron microscopy photograph of the cuboid silver powder obtained in Example 3 is presented in FIG. 5A, and the scanning electron microscopy photograph of the cross-section of the cuboid silver powder is presented in FIG. 5B.

Comparative Example 1

A silver powder of Comparative Example 1 was obtained in the same manner as in Example 1, except that the process of allowing the silver particles and the media to collide with each other was performed at 800 rpm for 240 minutes.

Figure 6A:
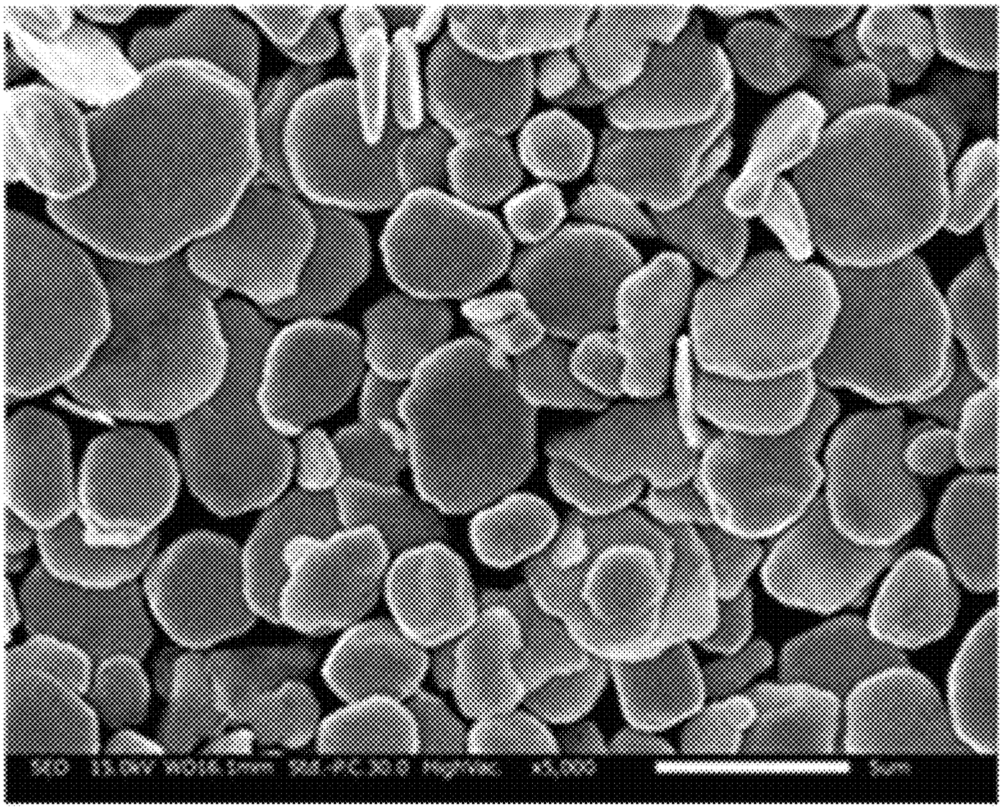
FIG. 6A is a scanning electron microscopy photograph of the silver powder produced in Comparative Example 1.
Figure 6B:
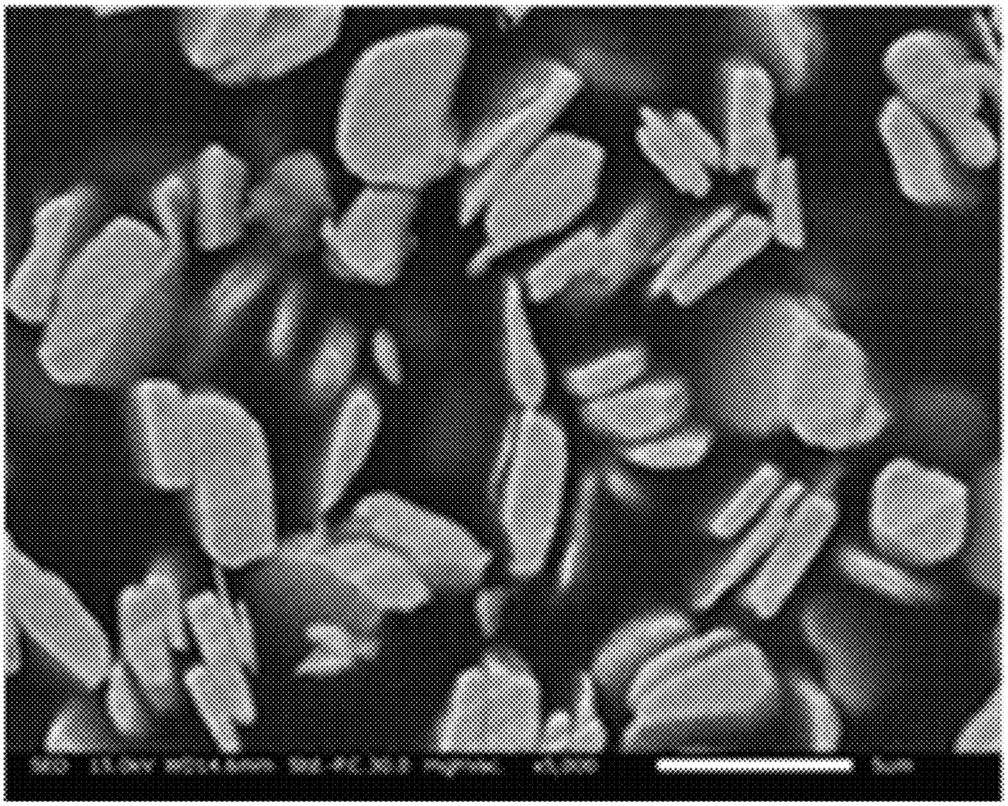
FIG. 6B is a scanning electron microscopy photograph of a cross-section of the silver powder produced in Comparative Example 1.

The scanning electron microscopy photograph of the cuboid silver powder obtained in Comparative Example 1 is presented in FIG. 6A, and the scanning electron microscopy photograph of the cross-section of the cuboid silver powder is presented in FIG. 6B.

Comparative Example 2

Figure 7A:
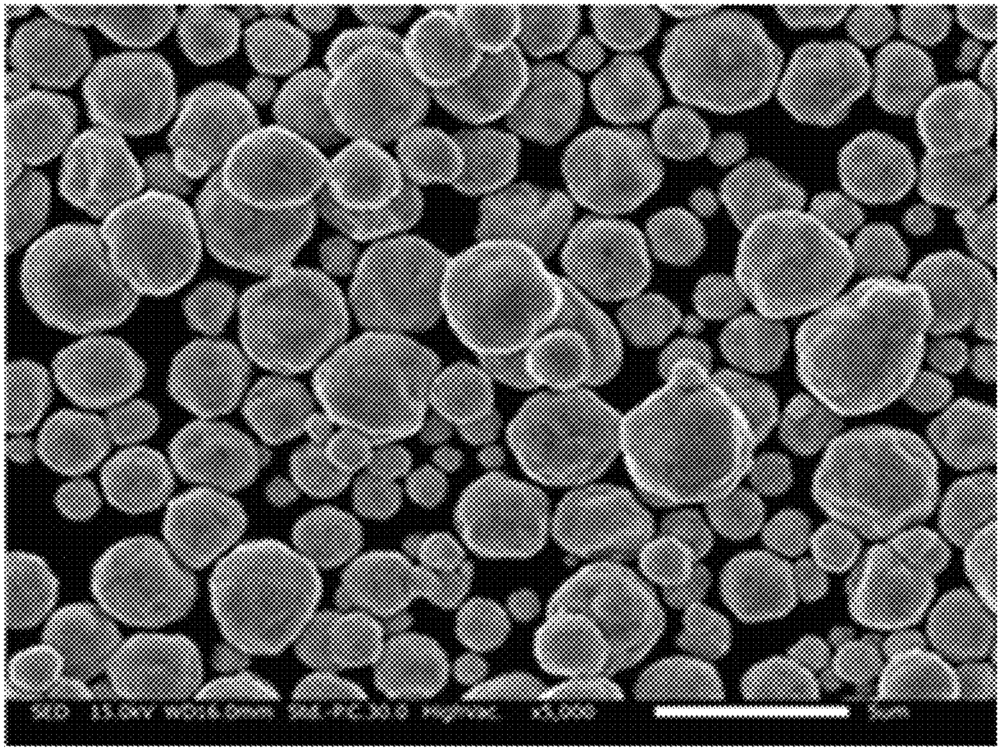
FIG. 7A is a scanning electron microscopy photograph of the silver powder of Comparative Example 2.
Figure 7B:
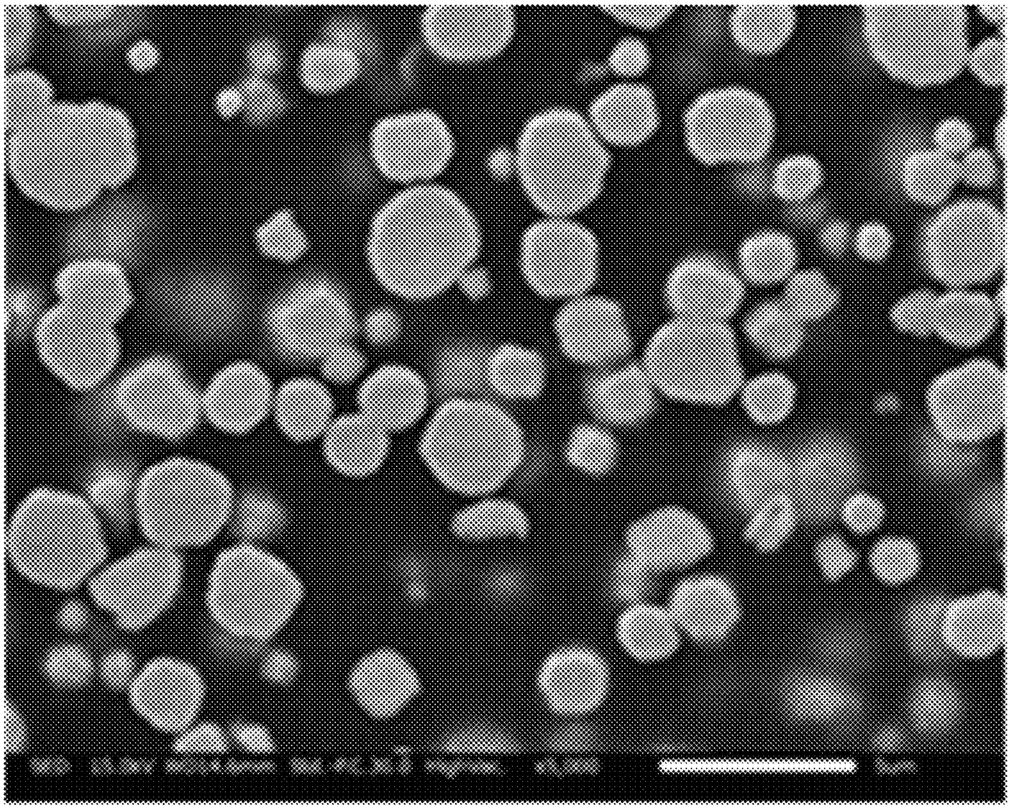
FIG. 7B is a scanning electron microscopy photograph of a cross-section of the silver powder of Comparative Example 2.

The process of colliding the silver particles and the media with each other was not performed, and the spherical silver powder (AG-5-54F, produced by DOWA HIGHTECH CO., LTD.) was used as it was. The scanning electron microscopy photograph of the spherical silver powder of Comparative Example 2 is presented in FIG. 7A, and the scanning electron microscopy photograph of the cross-section of the silver powder is presented in FIG. 7B.

Next, measurement results of a shape, BET specific surface area, particle size distribution, Ig-Loss, and tapped densities of the spherical silver powder (AG-5-54F) used in Examples 1 and 2 and Comparative Examples 1 and 2, and the spherical silver powder (AG-5-1F) used in Example 3 are presented in Table 1. Measuring methods of the BET specific surface area, particle size distribution, Ig-Loss, and tapped densities of the spherical silver powder (AG-5-54F) and spherical silver powder (AG-5-1F) are the same as the below-described measuring methods of Examples 1 to 3 and Comparative Examples 1 to 2.

TABLE 1

| Dispersant for preparation of silver powder | | Silver powder AG-5-54F Stearic acid | Silver powder AG-5-1F Oleic acid |
|---|---|---|---|
| Shape of silver powder | | Spherical | Spherical |
| BET specific surface area ($m^2/g$) | | 0.24 | 0.24 |
| Particle size distribution | $D_{10}$ (μm) | 1.5 | 1.9 |
| | $D_{50}$ (μm) | 2.5 | 3.0 |
| | $D_{90}$ (μm) | 4.0 | 4.8 |
| Ig-loss (%) | | 0.17 | 0.5 |
| Tapped density (g/mL) | | 6.0 | 6.1 |

Next, the silver powder obtained in each of Examples 1 to 3 and Comparative Examples 1 to 2 was subjected to measurement of a shape, a BET specific surface area, a particle size distribution, Ig-Loss, a tapped density, an average of a ratio of a perimeter of a silver particle to a perimeter of rectangle circumscribing the silver particle, a percentage of the silver particles having the circularity coefficient of 0.65 to 0.88, an average of a shape factor, a percentage of the silver particles having the shape factor of 1.4 to 2.6, and an average of an aspect ratio in the following manner. The results are presented in Table 2.

BET Specific Surface Area

The BET specific surface area of each of the produced silver powders was measured by a BET specific surface area measuring device (Macsorb HM-model 1210, produced by MOUNTECH Co., Ltd.) according to a BET single-point method by nitrogen adsorption. For the measurement of the BET specific surface area, degassing was performed before the measurement at the condition of 60° C. for 10 minutes.

Measuring Method of Particle Size Distribution

A 10th percentile value ($D_{10}$), 50th percentile value ($D_{50}$), and 90th percentile value ($D_{90}$) of a volume-based cumulative particle size distribution of each of the produced silver particles were measured in the following manner, and a ratio $[(D_{90}-D_{10})/D_{50}]$ was determined.

To 40 mL of isopropyl alcohol (IPA), 0.1 g of the silver powder was added. After dispersing the resultant mixture for 2 minutes by an ultrasonic homogenizer (device name: US-150T, produced by NIHONSEIKI KAISHA LTD.; 19.5 kHz, chip edge diameter of 18 mm), the dispersion solution was subjected to measurement by a laser diffraction scattering particle size distribution analyzer (Microtrac MT-3300 EXII, produced by MicrotracBELL Corp.).

Methods of Determining Ratio of Perimeter of Particle to Perimeter of Rectangle Circumscribing Particle, Circularity Coefficient, Shape Factor, and Aspect Ratio Each silver powder was added to a resin (EPOFIX RESIN produced by Struers) with a curing agent (EPOFIX HARDENER produced by Struers), and the resin was cured. The cured resin was polished by a cross-section polisher (ArBlade5000, produced by Japan High-Tech Corporation) to expose cross-sections of the silver particles of the silver powder. The cross-sections of the silver particles were each observed under a scanning electron microscope (JEOL JSM-IT300LV, produced by JEOL Ltd.) at magnification of 5,000 times. An outline of the silver particle was traced on each of the cross-sections of randomly selected 100 or more silver particles, among the cross-sections of the silver particles with which the entire outlines could be observed in the field of view as depicted in FIG. 2, using image analysis software (image-analyzing particle size distribution measurement software MacView, produced by MOUNTECH Co., Ltd.) to measure a major axis, a minor axis, a perimeter (L) of each silver particle, an area (S) of each silver particle, and a maximum length ($L_{max}$) Of each silver particle. As the major axis and the minor axis, values of the major axis and minor axis with which an area of a rectangle circumscribing the silver particle became the minimum were automatically calculated. Based on the obtained values, a ratio of the perimeter of the silver particle to the perimeter of the rectangle circumscribing the silver particle was calculated according to (Formula 1) below. Moreover, an average of the values of the circularity coefficient and an average of the values of the shape factor were calculated according to (Formula 2) below and (Formula 3) below, respectively, and a percentage of the silver particles having the circularity coefficient of 0.65 to 0.88 and a percentage of the silver particles having the shape factor of 1.4 to 2.6 were determined. Moreover, an average of the values of the aspect ratio (major axis/minor axis) was calculated.

$$L/(2\times\text{major axis}+2\times\text{minor axis}) \quad \text{(Formula 1)}$$

where L is the perimeter (μm) of the one silver particle, and the major axis and the minor axis are, respectively, a long side (μm) and a short side (μm) of the rectangle of a minimum area that circumscribes an outline of a cross-section of the one silver particle.

$$4\pi S/L^2 \quad \text{(Formula 2)}$$

where S is an area ($\mu m^2$) of a silver particle, and L is a perimeter (μm) of the silver particle.

$$\pi(L_{max})^2/4S \quad \text{(Formula 3)}$$

where S is an area ($\mu m^2$) of a silver particle, and $L_{max}$ is a maximum length (μm) of the silver particle.

Measuring Method of Ignition Loss (Ig-Loss)

The ignition loss (Ig-Loss) of each of the produced silver powders was measured as follows. A silver powder sample (3 g) was precisely weighed (weighed value: w1) and placed in a porcelain crucible, followed by heating up to 800° C. The temperature was maintained at 800° C. for 30 minutes, which was the time sufficient to achieve a state of a constant weight. Then, the silver powder sample was cooled, and weighed again (weighed value: w2). The ignition loss value was determined by assigning the above w1 and w2 in (Equation 4) below.

$$\text{Ignition loss } (Ig\text{−Loss}) \text{ value (\% by mass)} = (w1 - w2)/w1 \times 100 \quad \text{(Equation 4)}$$

Measuring Method of Tapped Density

The tapped density of each of the produced silver powders was measured as follows. The silver powder (30 g) was weighed and added to a 20 mL test tube, the sample in the test tube was tapped 1,000 times with a drop of 20 mm using a tapped density measuring device (a bulk density measuring device SS-DA-2, produced by Shibayama Scientific Co., Ltd.), and a tapped density of the sample was calculated by the following equation.

Tapped density (g/mL)=weight of sample (15 g)/volume (mL) of sample after tapping

TABLE 2

| | | Ex. 1 | Ex. 2 | Ex. 3 | Comp. Ex. 1 | Comp. Ex. 2 |
|---|---|---|---|---|---|---|
| Dispersant for silver powder production | | Stearic acid | Stearic acid | Oleic acid | Stearic acid | Stearic acid |
| Lubricant for cuboid forming process | | — | Stearic acid | — | — | — |
| Shape of silver powder | | Cuboid | Cuboid | Cuboid | Flake-like | Spherical |
| BET specific surface area ($m^2$/g) | | 0.25 | 0.29 | 0.24 | 0.38 | 0.24 |
| Particle | $D_{10}$ (μm) | 1.6 | 1.7 | 2.0 | 2.0 | 1.5 |
| size | $D_{50}$ (μm) | 2.7 | 2.7 | 3.6 | 3.4 | 2.5 |
| distribution | $D_{90}$ (μm) | 4.4 | 4.2 | 6.4 | 5.7 | 4.0 |
| $(D_{90} - D_{10})/D_{50}$ | | 1.0 | 1.0 | 1.2 | 1.1 | 1.0 |
| BET specific surface area × $D_{50}$ ($m^3$/g) | | 6.9E−07 | 7.6E−07 | 8.5E−07 | 1.3E−06 | 6.1E−07 |
| Tapped density (g/mL) | | 6.3 | 5.0 | 6.3 | 5.7 | 6.0 |
| Ig-loss (%) | | 0.18 | 0.46 | 0.47 | 0.20 | 0.17 |
| Average of aspect ratio | | 1.53 | 1.80 | 1.39 | 3.31 | 1.17 |
| Average of circularity coefficient | | 0.83 | 0.81 | 0.82 | 0.60 | 0.91 |
| Percentage (%) of silver particles having circularity coefficient of 0.65 to 0.88 | | 62 | 41 | 59 | 33 | 21 |
| Average of shape factor | | 1.68 | 1.98 | 1.58 | 3.70 | 1.32 |
| Percentage (%) of silver particles having shape factor of 1.4 to 2.6 | | 54 | 44 | 59 | 36 | 21 |
| Average of ratio of perimeter of silver particle to perimeter of rectangle circumscribing silver particle | | 0.86 | 0.85 | 0.86 | 0.88 | 0.82 |

Production of Conductive Paste

Each of the silver powders of Examples 1 to 3 and Comparative Examples 1 to 2 and a spherical silver powder (a silver powder including spherical silver particles, produced by DOWA HIGHTECH CO., LTD., AG-2-1C agent added) were mixed at a weight ratio of 5:5 to prepare a raw silver powder.

Next, an epoxy resin (jER1009, produced by Mitsubishi Chemical Corporation) was added to a solvent (butyl carbitol acetate, referred to as "BCA" hereinafter), and the resultant mixture was heating while stirring until the epoxy resin was completely dissolved, thereby preparing an epoxy resin jER1009 vehicle. The concentration of jER1009 in the epoxy resin vehicle was 62.23% by mass.

The above raw silver powder (92.60% by mass), 3.90% by mass of an epoxy resin (EP-4901E, produced by ADEKA CORPORATION), 1.57% by mass of the epoxy resin jER1009 vehicle, 0.24% by mass of a curing agent (boron trifluoride monoethyl amine complex), and an optimal amount of a solvent (BCA) were mixed and kneaded together.

In the mixing and kneading, first, the mixture was stirred to mix for 30 seconds at 1, 200 rpm (revolution)/600 rpm (rotation) using a non-propeller rotation-revolution motion mixer/degasser (VMX-N360, produced by EME Inc.), and then the obtained mixture was kneaded by a three-roll mill (EXAKT80S produced by Otto Hermann). In the manner as described above, each of conductive pastes of Examples 1 to 3 and Comparative Examples 1 to 2 before viscosity adjustment was obtained. The viscosity of each of the obtained conductive pastes before the viscosity adjustment was measured in the following manner. The results are presented in Table 3.

Viscosity of Conductive Paste

The viscosity of each conductive paste was measured by 5XHBDV-IIIUC produced by Brookfield that was a rotary viscometer under the following conditions. As a cone spindle, CPE-52 was used. The measurement temperature was set at 25° C., and the rotational speed of the cone spindle was set at 1 rpm. As the value of the viscosity, a value measured by rotating the cone spindle for 5 minutes was used.

TABLE 3

| | Ex. 1 | Ex. 2 | Ex. 3 | Comp . Ex. 1 | Comp. Ex. 2 |
|---|---|---|---|---|---|
| Viscosity (1 rpm) (Pa · s) | 512 | 734 | 441 | 405 | 556 |

Further, to the conductive paste before the viscosity adjustment of each of Examples and Comparative Examples, BCA was appropriately added to adjust the viscosity to approximately 300 Pa·s, thereby obtaining each of conductive pastes of Examples 1 to 3 and Comparative Examples 1 to 2 after the viscosity adjustment.

The viscosity of each of the obtained conductive pastes after the viscosity adjustment was measured in the same manner as the above. The results are presented in Table 4.

Formation of Conductive Film

With each of the obtained conductive pastes after the viscosity adjustment, each of a line pattern of 9 lines each having a length of 105 mm with a design width (line width) of 30 μm and a line pattern of 9 lines each having a length of 105 mm with a design width (line width) of 35 μm was printed on an alumina substrate by a screen printer (MT-320T, produced by Micro-tec Co., Ltd.) at the speed of 150 mm/s to form a film of the respective conductive paste. The obtained film was dried at 150° C. for 10 minutes in an air circulation dryer, followed by further heating at 200° C. for 30 minutes to cure the film, thereby forming a line-pattern conductive film.

Each of the obtained conductive films was evaluated on line resistance, disconnection rate, and line cross-sectional area in the following manner. The results are presented in Table 4.

Line Resistance

The resistance of each conductive film formed from a respective conductive paste after the viscosity adjustment was measured using a digital multimeter (R6551, produced by ADVANTEST), and line resistance with the design width of 30 μm and line resistance with the design width of 35 μm were determined from the average value of the resistance of the nine lines of the line pattern. A very high measurement value of the line resistance, i.e., 100 kΩ or greater, was regarded as indicating disconnection, and was excluded from the calculation of the average.

Disconnection Rate

In the case where a very high measurement value of the line resistance, i.e., 100 kΩ or greater, was regarded as indicating disconnection when the line resistance was measured on each conductive film formed from the respective conductive paste after the viscosity adjustment, a disconnection rate for the design width (line width) of 30 μm and a disconnection rate for the design width (line width) of 35 μm were determined. The disconnection rate was a percentage of the number of lines having disconnection relative to the total nine lines of the line pattern.

Line Cross-Sectional Area

Arbitrary 3 lines were selected from the 9 lines of the line pattern of each conductive film produced from the respective conductive paste after the viscosity adjustment, and a film thickness (μm) and line width (μm) of a center portion of each line in a longitudinal direction were measured by a laser microscope (VKX-1000, produced by Keyence Corporation), and a line cross-sectional area ($\mu m^2$) for each of the design widths (line widths) of 30 μm and 35 μm was determined by the film thickness×the line width.

TABLE 4

| | Ex. 1 | Ex. 2 | Ex. 3 | Comp. Ex. 1 | Comp. Ex. 2 |
|---|---|---|---|---|---|
| Viscosity (1 rpm) (Pa · s) | 314 | 314 | 302 | 306 | 310 |
| Silver powder (mass %) | 91.8 | 91.2 | 92.0 | 92.0 | 91.7 |
| Epoxy resin: EP-4901E (mass %) | 3.9 | 3.8 | 3.9 | 3.9 | 3.9 |
| Epoxy resin: jER1009 (mass %) | 1.0 | 1.0 | 1.0 | 1.0 | 1.0 |
| Curing agent: boron trifluoride monoethyl amine complex (mass %) | 0.2 | 0.2 | 0.2 | 0.2 | 0.2 |
| Solvent: BCA (mass %) | 3.1 | 3.8 | 2.9 | 2.9 | 3.3 |
| Line resistance (Ω) of line width 30 μm | 36 | 40 | 36 | 39 | 40 |
| Line resistance (Ω) of line width 35 μm | 27 | 29 | 27 | 30 | 32 |
| Disconnection rate (%) of line width 30 μm | 0 | 0 | 0 | 22 | 11 |
| Disconnection rate (%) of line width 35 μm | 0 | 0 | 0 | 0 | 0 |
| Line cross-sectional area ($\mu m^2$) of line width 30 μm | 261 | 240 | 235 | 210 | 207 |
| Line cross-sectional area ($\mu m^2$) of line width 35 μm | 310 | 334 | 338 | 255 | 271 |

It was found from the results of Table 4 that the conductive films produced from the conductive pastes using the cuboid silver powders of Examples 1 to 3 had the lower line resistance and lower disconnection rate compared to the conductive films produced from the conductive pastes using the silver powders of Comparative Examples 1 and 2.

This international application is based upon and claims priority to Japanese Patent Application No. 2022-040925, filed on Mar. 16, 2022, the entire contents of which are incorporated herein by reference.

The invention claimed is:

1. A cuboid silver powder, comprising:

silver particles, wherein the cuboid silver powder has a BET specific surface area of 0.5 $m^2/g$ or less, an average aspect ratio of the cuboid silver powder is 1.2 or greater and less than 2.0 as determined by observing cross-sections of 100 or more silver particles from the silver particles, and an average of values of a ratio represented by Formula 1 below is 0.84 or greater, the ratio being a ratio of a perimeter of one silver particle among the silver particles to a perimeter of a rectangle circumscribing the one silver particle, Formula 1: $L/(2\times\text{major axis}+2\times\text{minor axis})$ where L is the perimeter (μm) of the one silver particle, and the major axis and the minor axis are, respectively, a long side (μm) and a short side (μm) of the rectangle of a minimum area that circumscribes an outline of a cross-section of the one silver particle.

2. The cuboid silver powder according to claim 1, wherein an average of values of a circularity coefficient represented by Formula 2 below is 0.65 to 0.88, Formula 2: $4\pi S/L^2$ where S is an area ($\mu m^2$) of one silver particle among the silver particles, and L is the perimeter (μm) of the one silver particle.

3. The cuboid silver powder according to claim 2, wherein a percentage of the silver particles of the cuboid silver powder having the circularity coefficient of 0.65 to 0.88 is 40% or greater.

4. The cuboid silver powder according to claim 1, wherein an average of values of a shape factor represented by Formula 3 below is 1.4 to 2.6, Formula 3: $\pi(L_{max})^2/4S$ where S is an area ($\mu m^2$) of one silver particle among the silver particles, and $L_{max}$ is a maximum length (μm) of the one silver particle.

5. The cuboid silver powder according to claim 4, wherein a percentage of the silver particles of the cuboid silver powder having the shape factor of 1.4 to 2.6 is 40% or greater.

6. The cuboid silver powder according to claim 1, wherein a value obtained by multiplying a 50th percentile value ($D_{50}$) of a volume-based cumulative particle size distribution of the silver particles of the cuboid silver powder, which is measured by a laser diffraction scattering particle size distribution analysis method, with the BET specific area is 6.5E-07 $m^3/g$ or greater and 1.0E-06 $m^3/g$ or less.

7. The cuboid silver powder according to claim 1, wherein the BET specific surface area is 0.35 $m^2/g$ or less.

8. A conductive paste comprising the cuboid silver powder according to claim 1.

* * * * *